United States Patent [19]

Manuel

[11] 4,265,753
[45] May 5, 1981

[54] AERATION FILTRATION TANK AND WATER TREATMENT SYSTEM

[76] Inventor: Maylam Manuel, 601 S. Armada Dr., Venice, Fla. 33595

[21] Appl. No.: 159,510

[22] Filed: Jun. 16, 1980

[51] Int. Cl.$^3$ ............................ C02F 1/20; C02F 1/58
[52] U.S. Cl. .................................. 210/199; 55/192; 210/207; 210/218; 210/220; 210/256
[58] Field of Search .................... 55/55, 189, 192; 210/199, 205, 207, 218, 220, 221 R, 256, 261

[56] References Cited

U.S. PATENT DOCUMENTS

| | | | |
|---|---|---|---|
| 838,535 | 12/1906 | Greer | 210/207 X |
| 2,120,786 | 6/1938 | Jordan | 210/205 X |
| 2,353,358 | 7/1944 | Prager | 210/207 X |
| 2,446,644 | 8/1948 | Lawrason | 210/53 X |
| 2,483,706 | 10/1949 | Lind | 210/207 |
| 3,054,602 | 9/1962 | Proudman | 261/21 |
| 4,093,549 | 6/1978 | Wilson | 210/218 X |

FOREIGN PATENT DOCUMENTS

| | | | |
|---|---|---|---|
| 814278 | 9/1951 | Austria | 210/207 |
| 1225608 | 9/1966 | Fed. Rep. of Germany | 210/199 |
| 2408794 | 9/1975 | Fed. Rep. of Germany | 210/220 |
| 522918 | 7/1940 | United Kingdom | 55/192 |

*Primary Examiner*—Robert H. Spitzer
*Attorney, Agent, or Firm*—Hauke and Patalidis

[57] ABSTRACT

An aeration filtration tank and system for treating raw feed water includes a first tank or chamber and a second tank or chamber within the first chamber. An annular overflow platform is provided atop the second chamber and around the periphery of said platform are a plurality of weirs.

Raw feed water enters a precipitation chamber at the bottom of the first chamber and flows slowly into the second chamber. As the water rises in the second chamber it is treated, as necessary, with fluid reagents and with air.

Because the overflow platform is substantially larger in area than the cross sectional area of the second chamber, the water flows relatively slowly through the weirs and any gases entrained in the water are liberated. The gases are removed from the first chamber by an exhaust fan and conduit atop the first chamber.

A small third tank within the first tank is fluidly connected with a conduit to withdraw clarified and purified water from the first tank.

7 Claims, 1 Drawing Figure

U.S. Patent    May 5, 1981    4,265,753
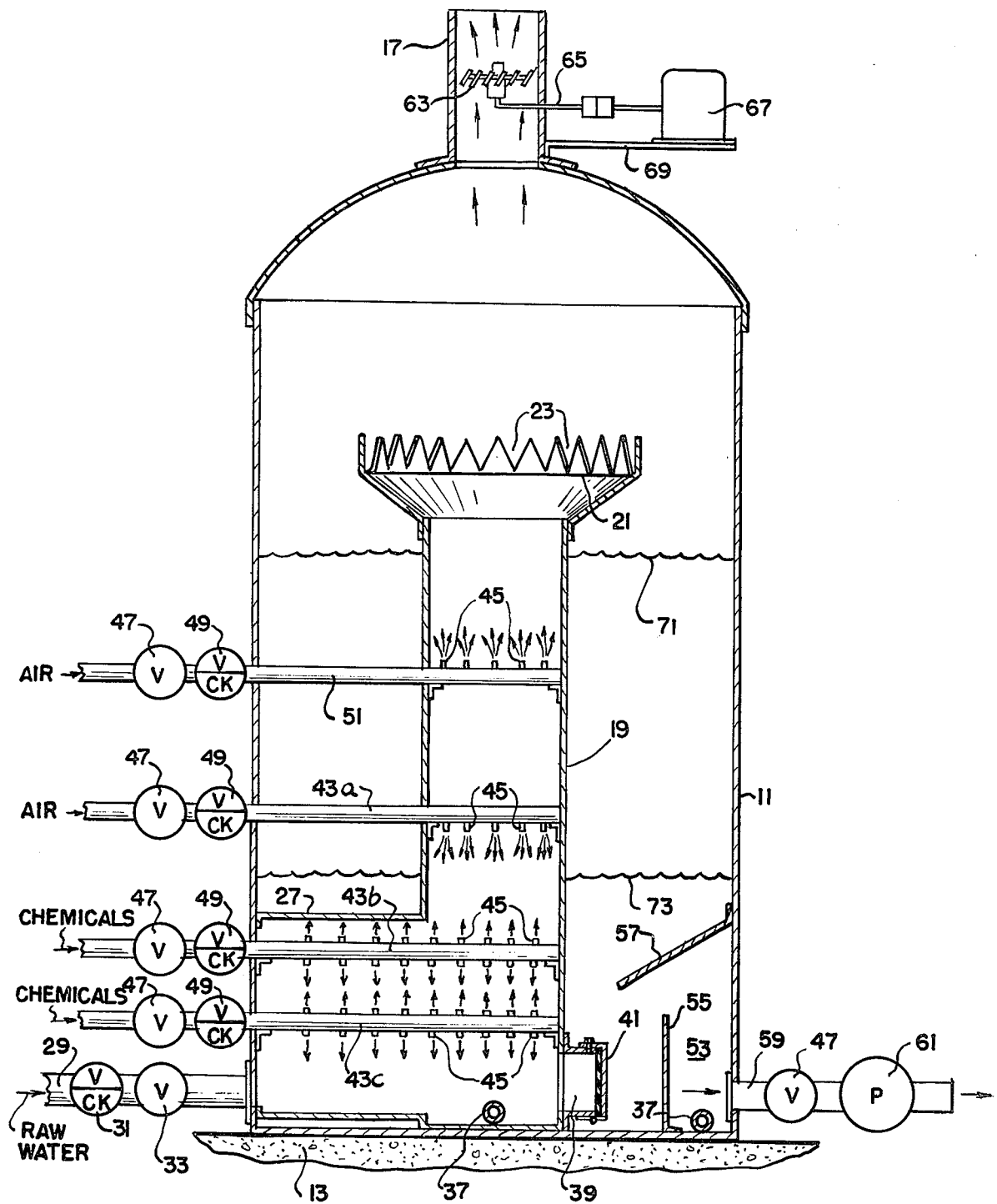

AERATION FILTRATION TANK AND WATER TREATMENT SYSTEM

BACKGROUND OF THE INVENTION

The present invention relates to apparatus and to systems for treating contaminated water, and more particularly, for treating and clarifying drinking water, sewerage water, hard and briney water, and water containing solid particulate matter.

In some locations there is a continual need to clarify and purify raw feed water, which may be dirty well water, sewerage water, mineral-bearing water and the like. Most of such waters contain solid particulate matter and entrained gases. Before such waters can be used for irrigation purposes and other uses, such raw feed water must be clarified and purified. In the case of sewerage water, the entrained gases must be removed to reduce unpleasant odors before such treated water can be used for any purpose.

Various apparatus for treating contaminated water in many different ways are shown and described in the prior art, but nothing approaches the structure and system of the present invention which is both simple and energy efficient.

SUMMARY OF THE INVENTION

An aeration tank and system for treating raw feed water, in accordance with the invention, comprises a first tank or chamber for holding purified water, and a second tank or chamber within the first tank or chamber. Raw feed water enters the second tank; flows upwardly therein; and is treated with liquid reagents and air, as necessary. An annular overflow platform atop the second chamber has around its perimeter a plurality of weirs that cause the treated water flowing through the weirs to give up any entrained gases.

For a further understanding of the invention and for features and advantages thereof, reference may be made to the following description of one embodiment of the invention and to the drawing showing such embodiment of the invention.

BRIEF DESCRIPTION OF THE DRAWING

The drawing discloses a vertical section of an aeration filtration tank and water treatment system in accordance with one embodiment of the invention.

DETAILED DESCRIPTION

Referring to the drawing, a tank or chamber 11 that is cylindrical preferably is situated on a suitable foundation 13. The tank or chamber 11 has a dome-like cover 15 to which is attached an effluent exhaust conduit 17.

Disposed centrally and axially within the tank or chamber 11 is a vertically oriented chamber 19 that is preferably, but not necessarily, cylindrical. Atop the cylindrical chamber 19 is an overflow platform 21 that is annular in shape. The area of the annular platform 21 is at least four times as large as the cross sectional area of the cylindrical area of the chamber 19. In some applications the area of the overflow platform 21 may be several times larger than the ratio four stated herein.

Around the perimeter of the imperforate overflow platform 21 is an arrangement of V-shaped weirs 23 through which flows water from the chamber 19. Normally the level of water in the tank or chamber 11 into which the water passing through the weirs flows is below the overflow platform 21. In the drawing a high level of water is indicated at 71 and a low water level is indicated at 73, both of which are mentioned hereinafter.

Near the bottom of the tank or chamber 11 and the cylindrical chamber 19 is a horizontal tubular conduit 27 that may be several times larger in cross sectional area than a raw water inlet conduit 29 through which raw feed water enters the tank 11. The flow of raw feed water in the conduit 29 is controlled in the usual manner by a stop valve 33 and a check valve 31. The cross sectional area of the horizontal conduit 27 is considerably larger than the cross sectional area of the conduit 29.

Near the bottom of the chamber 19 is a wash-out pipe 37 and an access conduit 39 that is closed by a suitable cover 41 in a conventional manner. Such access conduit affords access to the interior of the chamber 19 for maintenance and other purposes.

A plurality of horizontal tubular conduits 43a, 43b, 43c are arranged about where shown in the drawing and each such conduit fluidly connects with the interior of the chamber 19. Each such conduit is provided with a plurality of spray nozzles 45 disposed along the length of that portion within the chamber 19. Externally of the tank 11, each such conduit is provided with a suitable conventional stop valve 47 and check valve 49.

Another horizontal tubular conduit 51 is disposed at some appropriate height in the tank or chamber 11 and a portion of the conduit 51 within the chamber 19 is provided with a plurality of spray nozzles 45. The conduit 51 is also provided with a conventional stop valve 47 and check valve 49 located externally of the tank 11.

As shown in the drawing, a relatively small tank or chamber 53, formed by a standing vertical wall 55 and the wall of the chamber 11 is disposed at the bottom of the chamber 11. A cover 57 is disposed angularly in spaced apart relation over the tank 53 and a horizontal conduit 59 fluidly connects the tank 53 with a conventional fluid pump 61 through a conventional stop valve 47. The chamber 53 is also provided with a wash-out pipe 37 located about where shown on the drawing.

Within the exhaust conduit 17 is an exhaust fan 63 driven by a shaft 65 from a conventional variable-speed drive unit 67. The speed unit 67 may be mounted on any suitable support like the structure 69 shown in the drawing.

The aeration filtration water treatment plant shown and described herein is a complete system in one unit that is suitable for installation in a city, village, town or in rural areas comprised of a few dwellings only. In areas where the mineral content of the water is abnormally high, the filtration aeration system can be used as a complete pretreatment water system thereby reducing the operating costs of expensive filters and membranes required for conventional water treatment equipment and systems.

Furthermore, the unique design of the present system of the invention requires very little electric power and very little, if any, of the feed water entering the system is lost or wasted.

In operating the apparatus and system of the invention, raw feed water flows in the conduit 29 and flows first into the horizontal tubular conduit 27 and the flow of water is slowed greatly due to the much larger cross sectional area of the conduit 27 than the conduit 29. Thus, all of the heavy and most of the fine solid particulate matter suspended in the raw feed water deposits in the bottom of the tubular member 27, or in the bottom of the chamber 19. Then the precipitated solid matter can be flushed from the conduit 27 and chamber 29 through their washout pipes respectively.

As the raw feed water flows upwardly in the chamber 19, it is treated with fluid purifying reagents flowing from the nozzles 45 in the conduits 43a, 43b, 43c, and with air flowing from the nozzles 45 in the conduit 51 as required. The purifying reagents provide a good mixing of the reagents with the raw feed water, and flow of the reagents may be controlled by the valves in each conduit. In some applications, automatic flow-control equipment may be provided to regulate and control the flow of such reagents and air.

Because the area of the overflow platform is so much larger than the area of the chamber 19, in cross section, the treated water flows slowly on the overflow platform and through the weirs, thereby allowing entrained gases to escape from the water. Liberated exhausted gases then are induced to flow upward in the exhaust conduit by the exhaust fan 63 for disposal in a suitable manner.

In some applications, the treated water in the chamber 11 may be at a high level indicated by line 71 or at a low level indicated by line 73. Generally, the water level in the chamber 11 will be at some level between the high 71 and the low 73 levels.

Treated water is withdrawn from the aeration filtration tank 11 through the conduit 59 connected to the small chamber 53 by means of the pump 61 and thereafter it may be distributed in a conventional water system.

Those skilled in the art will recognize many features and advantages of the present invention among which the following are particularly significant:

That water containing various kinds of contaminants can be effectively treated by the apparatus and system of the invention without recourse to other apparatus;

That a complete water treating system of the invention can be operated as a single unit in any urban or rural area however large or small;

That the apparatus and system is economical to manufacture and to operate;

That the apparatus and system can operate effectively and efficiently even if the raw feed water enters the system at only 25 pounds per square inch pressure; thereby effecting great savings in electric power energy to operate the system;

That the apparatus and system can be designed to handle large as well as small volumes of feed water; the system has practically unlimited capacity to treat water;

That the apparatus and system does not waste water and only the small amount of water vapor in the liberated gases carry away water at all; and That by removing practically all of the gases and solid particulate matter from the raw feed water, the treated water is clean enough to be chlorinated and distributed into any rural or urban water system.

Although the present invention and one embodiment therof has been described herein with a certain degree of particularity, it is understood that the scope of the invention is defined by what is hereafter claimed.

What is claimed is:

1. In apparatus for purifying raw feed water containing solid particulate matter and gases, the combination comprising:
   (a) a first chamber for holding purified water,
   (b) a second chamber disposed within said first chamber,
   (c) means for flowing said raw feed water into said second chamber and upwardly in said second chamber,
   (d) an overflow platform situated atop said second chamber and above the level of water in said first chamber with flow distributing means disposed around the perimeter of said platform,
   (e) means for introducing fluid purifying reagents into the water in said second chamber,
   (f) means for exhausting gases within said first chamber and therefrom, and
   (g) means for withdrawing the treated and purified water from said first chamber.

2. The invention of claim 1 wherein:
   (a) said flow distributing means is a plurality of weirs,
   (b) said means for introducing fluid purifying reagents comprises one or more fluid conduits fitted with nozzles disposed with said second chamber,
   (c) said means for flowing said raw feed water includes an inlet conduit connecting fluidly with said second chamber and a conduit external of said first chamber, said inlet conduit being substantially larger in cross sectional area than said external conduit, whereby solid particulate matter in said raw feed water precipitates in said inlet conduit and said second chamber, and
   (d) means for removing said precipitate solid matter from said inlet and said second chamber.

3. The invention of claim 1 wherein:
   (a) said means for exhausting gases from said first chamber includes power driven exhaust means.

4. The invention of claim 2 including:
   (a) flow control equipment disposed in said fluid conduits.

5. The invention of claim 1 including:
   (a) means for removing solid particulate matter from said second chamber.

6. The invention of claim 1 including:
   (a) a third chamber disposed within said first chamber that collects treated and purified water, said third chamber being fluidly connected to said means for withdrawing said treated and purified water.

7. In apparatus for purifying raw feed water containing solid particulate matter and entrained gases:
   (a) a first water receiving chamber,
   (b) a second chamber into which said raw feed water first enters disposed within said first chamber,
   (c) an annular platform atop said second chamber disposed above the level of water in said first chamber, said annular platform having an area that is at least four times the area of the cross section of said second chamber,
   (d) means around the perimeter of said platform for reducing the speed of water flowing from said platform and for increasing the surface area of water particles exposed to the ambient air within said first chamber, thereby liberating entrained gases in the treated water flowing from said platform,
   (e) means for introducing purifying reagents into the raw feed water in said second chamber,
   (f) means for aerating said raw feed water in said second chamber,
   (g) means for removing liberated gases from said first chamber, and
   (h) means for removing treated and purified water from said first chamber.

* * * * *